United States Patent
Zhou et al.

(10) Patent No.: US 9,111,575 B1
(45) Date of Patent: Aug. 18, 2015

(54) DATA STORAGE DEVICE EMPLOYING ADAPTIVE FEED-FORWARD CONTROL IN TIMING LOOP TO COMPENSATE FOR VIBRATION

(71) Applicant: Western Digital Technologies, Inc., Irvine, CA (US)

(72) Inventors: Jianguo Zhou, Foothill Ranch, CA (US); Wei Xi, Mission Viejo, CA (US); Guoxiao Guo, Irvine, CA (US); Hui Li, Singapore (SG)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/522,404

(22) Filed: Oct. 23, 2014

(51) Int. Cl.
  *G11B 21/02* (2006.01)
  *G11B 5/09* (2006.01)
  *G11B 20/10* (2006.01)
  *G11B 19/28* (2006.01)
  *G11B 5/596* (2006.01)

(52) U.S. Cl.
  CPC .......... *G11B 20/10509* (2013.01); *G11B 19/28* (2013.01)

(58) Field of Classification Search
  CPC ............ G11B 5/6005; G11B 5/59655; G11B 5/59633; G11B 5/5547; G11B 21/083; G11B 5/54
  USPC .............. 360/77.04, 78.14, 78.04, 75, 53, 51, 360/77.05, 77.08, 48, 77.07
  See application file for complete search history.

(56) References Cited

U.S. PATENT DOCUMENTS

| | | |
|---|---|---|
| 5,245,599 A | 9/1993 | Ishii et al. |
| 5,299,075 A | 3/1994 | Hanks |
| 5,333,138 A | 7/1994 | Richards et al. |
| 5,654,840 A | 8/1997 | Patton et al. |
| 5,663,847 A | 9/1997 | Abramovitch |
| 5,923,487 A | 7/1999 | Carlson et al. |
| 5,956,307 A | 9/1999 | Koudo et al. |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |

(Continued)

FOREIGN PATENT DOCUMENTS

JP    2001-266466    9/2001

OTHER PUBLICATIONS

Chi, H., et al., "Band-limited feedback cancellation with a modified filtered-XLMS algorithm for hearing aids," Elsevier, Speech Communication 39, 2003, pp. 147-161.

(Continued)

*Primary Examiner* — Nabil Hindi

(57) ABSTRACT

A data storage device is disclosed comprising a head actuated over a disk and a vibration detector configured to generate a vibration signal in response to a vibration affecting the data storage device. A timing loop is configured to generate a disk-locked clock substantially synchronized to a rotation frequency of the disk. An adaptation control signal is generated based on the vibration signal and an error signal of the timing loop. An adaptive filter is adapted based on the adaptation control signal, wherein the adaptive filter filters the vibration signal to generate feed-forward compensation values. The feed-forward compensation values are applied to the timing loop to compensate for the vibration.

16 Claims, 7 Drawing Sheets

(56) References Cited

U.S. PATENT DOCUMENTS

| | | |
|---|---|---|
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,115,200 A | 9/2000 | Allen et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,275,592 B1 | 8/2001 | Vartiainen |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,414,813 B2 | 7/2002 | Cvancara |
| 6,429,990 B2 | 8/2002 | Serrano et al. |
| 6,460,803 B1 | 10/2002 | Kiss et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,674,600 B1 | 1/2004 | Codilian et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,754,021 B2 | 6/2004 | Kisaka et al. |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,262 B1 | 9/2004 | Codilian et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,853,512 B2 | 2/2005 | Ozawa |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,909,574 B2 | 6/2005 | Aikawa et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,950,271 B2 | 9/2005 | Inaji et al. |
| 6,950,273 B2 | 9/2005 | Nakagawa et al. |
| 6,950,274 B2 | 9/2005 | Inaji et al. |
| 6,952,318 B1 | 10/2005 | Ngo |
| 6,952,322 B1 | 10/2005 | Codilian et al. |
| 6,954,324 B1 | 10/2005 | Tu et al. |
| 6,958,881 B1 | 10/2005 | Codilian et al. |
| 6,958,882 B2 | 10/2005 | Kisaka |
| 6,963,465 B1 | 11/2005 | Melkote et al. |
| 6,965,488 B1 | 11/2005 | Bennett |
| 6,967,458 B1 | 11/2005 | Bennett et al. |
| 6,967,804 B1 | 11/2005 | Codilian |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,016,141 B2 | 3/2006 | Bahirat et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,094 B2 | 5/2006 | Zhang et al. |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,776 B1 * | 10/2006 | Warren et al. .................. 360/51 |
| 7,126,781 B1 | 10/2006 | Bennett |
| 7,139,401 B2 | 11/2006 | Culman et al. |
| 7,141,951 B2 | 11/2006 | Hosono et al. |
| 7,142,385 B2 | 11/2006 | Shimotono et al. |
| 7,154,690 B1 | 12/2006 | Brunnett et al. |
| 7,158,329 B1 | 1/2007 | Ryan |

(56) References Cited

U.S. PATENT DOCUMENTS

| | | | |
|---|---|---|---|
| 7,158,334 | B2 | 1/2007 | Iwashiro |
| 7,180,703 | B1 | 2/2007 | Subrahmanyam et al. |
| 7,184,230 | B1 | 2/2007 | Chue et al. |
| 7,196,864 | B1 | 3/2007 | Yi et al. |
| 7,199,966 | B1 | 4/2007 | Tu et al. |
| 7,203,021 | B1 | 4/2007 | Ryan et al. |
| 7,209,321 | B1 | 4/2007 | Bennett |
| 7,212,364 | B1 | 5/2007 | Lee |
| 7,212,374 | B1 * | 5/2007 | Wang et al ................ 360/78.14 |
| 7,215,504 | B1 | 5/2007 | Bennett |
| 7,224,546 | B1 | 5/2007 | Orakcilar et al. |
| 7,248,426 | B1 | 7/2007 | Weerasooriya et al. |
| 7,251,098 | B1 | 7/2007 | Wang et al. |
| 7,253,582 | B1 | 8/2007 | Ding et al. |
| 7,253,989 | B1 | 8/2007 | Lau et al. |
| 7,265,931 | B2 | 9/2007 | Ehrlich |
| 7,265,933 | B1 | 9/2007 | Phan et al. |
| 7,265,934 | B2 | 9/2007 | Takaishi |
| 7,282,346 | B2 | 10/2007 | Fruehauf |
| 7,289,288 | B1 | 10/2007 | Tu |
| 7,298,574 | B1 | 11/2007 | Melkote et al. |
| 7,301,717 | B1 | 11/2007 | Lee et al. |
| 7,304,819 | B1 | 12/2007 | Melkote et al. |
| 7,319,570 | B2 | 1/2008 | Jia et al. |
| 7,330,019 | B1 | 2/2008 | Bennett |
| 7,330,327 | B1 | 2/2008 | Chue et al. |
| 7,333,280 | B1 | 2/2008 | Lifchits et al. |
| 7,333,290 | B1 | 2/2008 | Kupferman |
| 7,339,761 | B1 | 3/2008 | Tu et al. |
| 7,365,932 | B1 | 4/2008 | Bennett |
| 7,382,563 | B2 | 6/2008 | Saitoh et al. |
| 7,388,728 | B1 | 6/2008 | Chen et al. |
| 7,391,583 | B1 | 6/2008 | Sheh et al. |
| 7,391,584 | B1 | 6/2008 | Sheh et al. |
| 7,405,898 | B2 * | 7/2008 | Eleftheriou et al. ....... 360/77.07 |
| 7,423,833 | B1 | 9/2008 | Sutardja |
| 7,433,143 | B1 | 10/2008 | Ying et al. |
| 7,440,210 | B1 | 10/2008 | Lee |
| 7,440,225 | B1 | 10/2008 | Chen et al. |
| 7,450,334 | B1 | 11/2008 | Wang et al. |
| 7,450,336 | B1 | 11/2008 | Wang et al. |
| 7,453,661 | B1 | 11/2008 | Jang et al. |
| 7,457,071 | B1 | 11/2008 | Sheh |
| 7,466,509 | B1 | 12/2008 | Chen et al. |
| 7,468,855 | B1 | 12/2008 | Weerasooriya et al. |
| 7,471,483 | B1 | 12/2008 | Ferris et al. |
| 7,477,471 | B1 | 1/2009 | Nemshick et al. |
| 7,480,116 | B1 | 1/2009 | Bennett |
| 7,486,470 | B1 | 2/2009 | Semba |
| 7,489,464 | B1 | 2/2009 | McNab et al. |
| 7,489,472 | B2 | 2/2009 | Abrishamchian et al. |
| 7,492,546 | B1 | 2/2009 | Miyamura |
| 7,495,857 | B1 | 2/2009 | Bennett |
| 7,499,236 | B1 | 3/2009 | Lee et al. |
| 7,502,192 | B1 | 3/2009 | Wang et al. |
| 7,502,195 | B1 | 3/2009 | Wu et al. |
| 7,502,197 | B1 | 3/2009 | Chue |
| 7,505,223 | B1 | 3/2009 | McCornack |
| 7,529,057 | B1 | 5/2009 | Sutardja |
| 7,542,225 | B1 | 6/2009 | Ding et al. |
| 7,548,392 | B1 | 6/2009 | Desai et al. |
| 7,551,390 | B1 | 6/2009 | Wang et al. |
| 7,558,016 | B1 | 7/2009 | Le et al. |
| 7,561,365 | B2 | 7/2009 | Noguchi et al. |
| 7,573,670 | B1 | 8/2009 | Ryan et al. |
| 7,576,941 | B1 | 8/2009 | Chen et al. |
| 7,580,212 | B1 | 8/2009 | Li et al. |
| 7,583,470 | B1 | 9/2009 | Chen et al. |
| 7,595,953 | B1 | 9/2009 | Cerda et al. |
| 7,595,954 | B1 | 9/2009 | Chen et al. |
| 7,596,795 | B2 | 9/2009 | Ding et al. |
| 7,599,144 | B2 | 10/2009 | Suh et al. |
| 7,602,575 | B1 | 10/2009 | Lifchits et al. |
| 7,616,399 | B1 | 11/2009 | Chen et al. |
| 7,619,844 | B1 | 11/2009 | Bennett |
| 7,626,782 | B1 | 12/2009 | Yu et al. |
| 7,630,162 | B2 | 12/2009 | Zhao et al. |
| 7,633,704 | B2 | 12/2009 | Supino et al. |
| 7,639,447 | B1 | 12/2009 | Yu et al. |
| 7,656,604 | B1 | 2/2010 | Liang et al. |
| 7,656,607 | B1 | 2/2010 | Bennett |
| 7,660,067 | B1 | 2/2010 | Ji et al. |
| 7,663,835 | B1 | 2/2010 | Yu et al. |
| 7,675,707 | B1 | 3/2010 | Liu et al. |
| 7,679,854 | B1 | 3/2010 | Narayana et al. |
| 7,688,534 | B1 | 3/2010 | McCornack |
| 7,688,538 | B1 | 3/2010 | Chen et al. |
| 7,688,539 | B1 | 3/2010 | Bryant et al. |
| 7,697,233 | B1 | 4/2010 | Bennett et al. |
| 7,697,234 | B2 | 4/2010 | Higashino et al. |
| 7,701,661 | B1 | 4/2010 | Bennett |
| 7,710,676 | B1 | 5/2010 | Chue |
| 7,715,138 | B1 | 5/2010 | Kupferman |
| 7,729,079 | B1 | 6/2010 | Huber |
| 7,733,189 | B1 | 6/2010 | Bennett |
| 7,746,592 | B1 | 6/2010 | Liang et al. |
| 7,746,594 | B1 | 6/2010 | Guo et al. |
| 7,746,595 | B1 | 6/2010 | Guo et al. |
| 7,760,461 | B1 | 7/2010 | Bennett |
| 7,777,982 | B2 | 8/2010 | Kim et al. |
| 7,796,353 | B2 | 9/2010 | Schabes et al. |
| 7,800,853 | B1 | 9/2010 | Guo et al. |
| 7,800,856 | B1 | 9/2010 | Bennett et al. |
| 7,800,857 | B1 | 9/2010 | Calaway et al. |
| 7,808,739 | B2 | 10/2010 | Takasaki et al. |
| 7,839,591 | B1 | 11/2010 | Weerasooriya et al. |
| 7,839,595 | B1 | 11/2010 | Chue et al. |
| 7,839,600 | B1 | 11/2010 | Babinski et al. |
| 7,843,662 | B1 | 11/2010 | Weerasooriya et al. |
| 7,852,588 | B1 | 12/2010 | Ferris et al. |
| 7,852,592 | B1 | 12/2010 | Liang et al. |
| 7,864,481 | B1 | 1/2011 | Kon et al. |
| 7,864,482 | B1 | 1/2011 | Babinski et al. |
| 7,869,155 | B1 | 1/2011 | Wong |
| 7,876,522 | B1 | 1/2011 | Calaway et al. |
| 7,876,523 | B1 | 1/2011 | Panyavoravaj et al. |
| 7,916,415 | B1 | 3/2011 | Chue |
| 7,916,416 | B1 | 3/2011 | Guo et al. |
| 7,916,420 | B1 | 3/2011 | McFadyen et al. |
| 7,916,422 | B1 | 3/2011 | Guo et al. |
| 7,929,238 | B1 | 4/2011 | Vasquez |
| 7,961,422 | B1 | 6/2011 | Chen et al. |
| 8,000,053 | B1 | 8/2011 | Anderson |
| 8,027,119 | B2 | 9/2011 | Zhang |
| 8,031,423 | B1 | 10/2011 | Tsai et al. |
| 8,054,022 | B1 | 11/2011 | Ryan et al. |
| 8,059,357 | B1 | 11/2011 | Knigge et al. |
| 8,059,360 | B1 | 11/2011 | Melkote et al. |
| 8,072,703 | B1 | 12/2011 | Calaway et al. |
| 8,077,428 | B1 | 12/2011 | Chen et al. |
| 8,078,901 | B1 | 12/2011 | Meyer et al. |
| 8,081,395 | B1 | 12/2011 | Ferris |
| 8,085,020 | B1 | 12/2011 | Bennett |
| 8,116,023 | B1 | 2/2012 | Kupferman |
| 8,145,934 | B1 | 3/2012 | Ferris et al. |
| 8,179,626 | B1 | 5/2012 | Ryan et al. |
| 8,189,286 | B1 | 5/2012 | Chen et al. |
| 8,213,106 | B1 * | 7/2012 | Guo et al. .................. 360/77.08 |
| 8,254,222 | B1 | 8/2012 | Tang |
| 8,300,348 | B1 | 10/2012 | Liu et al. |
| 8,315,005 | B1 | 11/2012 | Zou et al. |
| 8,320,069 | B1 | 11/2012 | Knigge et al. |
| 8,351,174 | B1 | 1/2013 | Gardner et al. |
| 8,358,114 | B1 | 1/2013 | Ferris et al. |
| 8,358,145 | B1 | 1/2013 | Ferris et al. |
| 8,390,367 | B1 | 3/2013 | Bennett |
| 8,432,031 | B1 | 4/2013 | Agness et al. |
| 8,432,629 | B1 | 4/2013 | Rigney et al. |
| 8,451,697 | B1 | 5/2013 | Rigney et al. |
| 8,482,873 | B1 | 7/2013 | Chue et al. |
| 8,498,076 | B1 | 7/2013 | Sheh et al. |
| 8,498,172 | B1 | 7/2013 | Patton, III et al. |
| 8,508,881 | B1 | 8/2013 | Babinski et al. |
| 8,531,798 | B1 | 9/2013 | Xi et al. |

(56) References Cited

U.S. PATENT DOCUMENTS

| | | |
|---|---|---|
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,737,014 B2 * | 5/2014 | Massarotti et al. ........ 360/97.19 |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,797,673 B2 * | 8/2014 | Supino ........................ 360/77.07 |
| 8,804,267 B2 | 8/2014 | Huang et al. |
| 8,824,081 B1 | 9/2014 | Guo et al. |
| 8,824,262 B1 | 9/2014 | Liu et al. |
| 8,896,955 B1 | 11/2014 | Chen et al. |
| 8,922,938 B1 | 12/2014 | Chen et al. |
| 2002/0153451 A1 | 10/2002 | Kiss et al. |
| 2004/0080860 A1 | 4/2004 | Inaji et al. |
| 2004/0213100 A1 | 10/2004 | Iwashiro |
| 2004/0240101 A1 | 12/2004 | Inaji et al. |
| 2005/0088774 A1 | 4/2005 | Bahirat et al. |
| 2005/0096793 A1 | 5/2005 | Takeuchi |
| 2006/0291087 A1 | 12/2006 | Suh et al. |
| 2006/0291101 A1 | 12/2006 | Takaishi |
| 2007/0064334 A1 | 3/2007 | Jia et al. |
| 2008/0174900 A1 | 7/2008 | Abrishamchian et al. |
| 2009/0135516 A1 | 5/2009 | Takasaki et al. |
| 2010/0035085 A1 | 2/2010 | Jung et al. |
| 2010/0061007 A1 | 3/2010 | Matsushita et al. |
| 2010/0079906 A1 | 4/2010 | Wile et al. |
| 2010/0284546 A1 | 11/2010 | DeBrunner et al. |
| 2012/0284493 A1 | 11/2012 | Lou et al. |
| 2013/0120870 A1 | 5/2013 | Zhou et al. |
| 2013/0141811 A1 | 6/2013 | Hirano et al. |
| 2013/0148240 A1 | 6/2013 | Ferris et al. |

OTHER PUBLICATIONS

L. Hakansson, "The Filtered-x LMS Alogrithm", Department of Telecommunications and Signal Processing, University of Karlskrona/Rooneby, 372 25 Ronneby, Sweden, Jan. 15, 2004.

Widrow, B., et al., "Adaptive Noise Cancelling": Principles and Applications, Proceedings of the IEEE, vol. 63 (12), 1975, pp. 1692-1716.

Widrow, B., et al., "On Adaptive Inverse Control," Record of the Fifteenth Asilomar Conference on Circuits, Systems and Computers, Nov. 1981, pp. 185-189.

Young-Hoon Kim, et al., U.S. Appl. No. 13/862,320, filed Apr. 12, 2013, 20 pages.

Jifang Tian, et al., U.S. Appl. No. 13/458,863, filed Apr. 27, 2012, 23 pages.

Kuang-Yang Tu, et al., U.S. Appl. No. 13/927,096, filed Jun. 25, 2013, 18 pages.

Jianguo Zhou, et al., U.S. Appl. No. 14/099,886, filed Dec. 6, 2013, 22 pages.

* cited by examiner

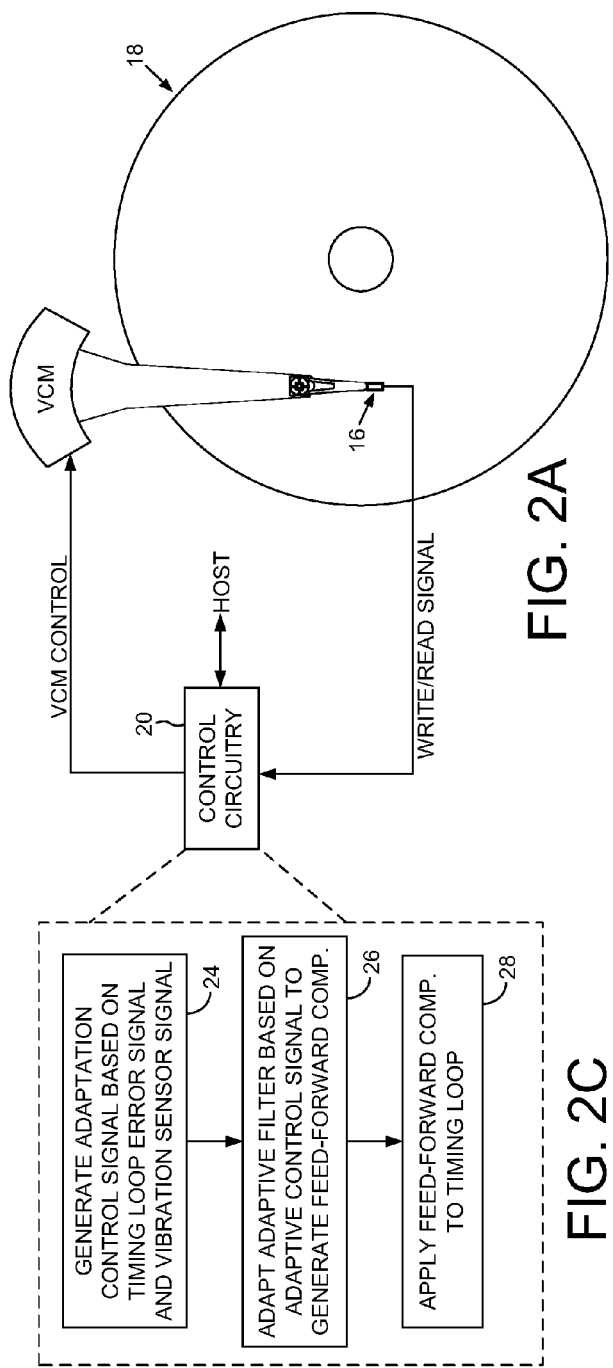
FIG. 2A
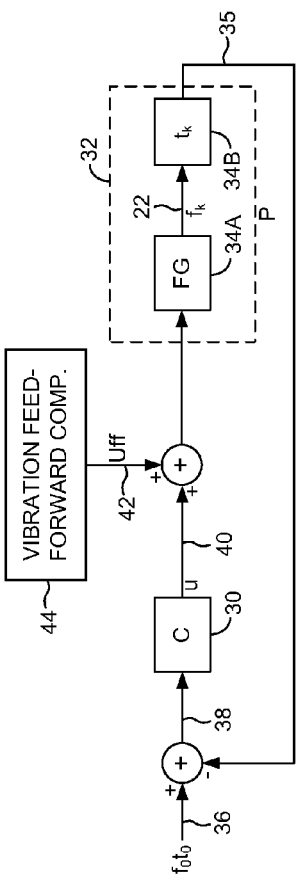
FIG. 2B
FIG. 2C

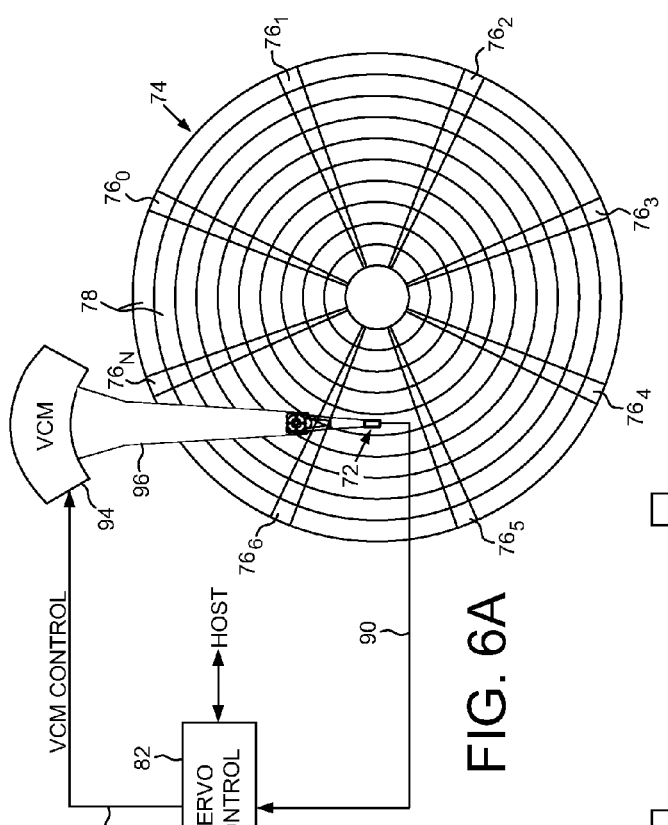
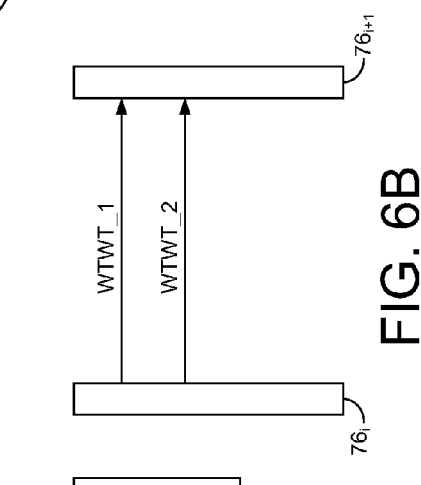
FIG. 6A
FIG. 6B
FIG. 6C

DATA STORAGE DEVICE EMPLOYING ADAPTIVE FEED-FORWARD CONTROL IN TIMING LOOP TO COMPENSATE FOR VIBRATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk and a vibration detector configured to generate a vibration signal in response to a vibration affecting the data storage device.

FIG. 2B shows a timing loop according to an embodiment configured to generate a disk-locked clock substantially synchronized to a rotation frequency of the disk.

FIG. 2C is a flow diagram according to an embodiment wherein an adaptation control signal is generated based on the vibration signal and an error signal of the timing loop, an adaptive filter is adapted based on the adaptation control signal, wherein the adaptive filter filters the vibration signal to generate feed-forward compensation values, and the feed-forward compensation values are applied to the timing loop to compensate for the vibration.

FIG. 6A shows a data storage device in the form of a disk drive according to an embodiment comprising a head having at least a first read element and a second read element.

FIG. 6B shows an embodiment wherein a first wedge-to-wedge time is generated based on the first read element, and a second wedge-to-wedge time is generated based on the second read element.

FIG. 6C is a flow diagram according to an embodiment wherein a nominal wedge-to-wedge time is generated based on the first wedge-to-wedge time and the second wedge-to-wedge time.

DETAILED DESCRIPTION

Figure 1:
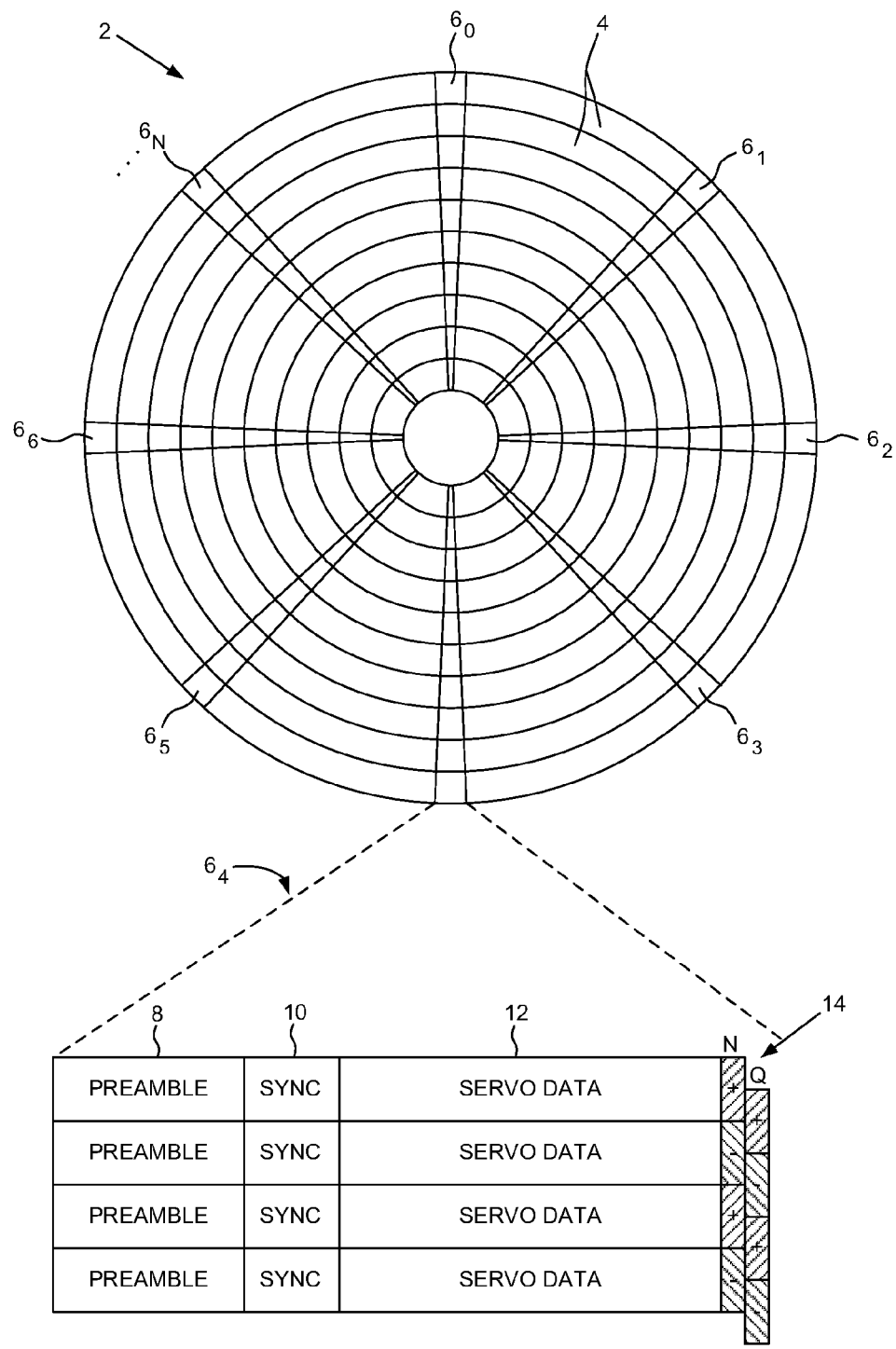
FIG. 1 shows a prior art disk format comprising a plurality of servo tracks defined by servo sectors.

FIG. 2A shows a data storage device in the form of a disk drive according to an embodiment comprising a head 16 actuated over a disk 18 and a vibration detector configured to generate a vibration signal in response to a vibration affecting the disk drive. The disk drive further comprises control circuitry 20 including a timing loop (FIG. 2B) configured to generate a disk-locked clock 22 substantially synchronized to a rotation frequency of the disk 18. The control circuitry 20 is configured to execute the flow diagram of FIG. 2C, wherein an adaptation control signal is generated based on the vibration signal and an error signal of the timing loop (block 24). An adaptive filter is adapted based on the adaptation control signal, wherein the adaptive filter filters the vibration signal to generate feed-forward compensation values (block 26). The feed-forward compensation values are applied to the timing loop to compensate for the vibration (block 28).

In the embodiment of FIG. 2B, the timing loop for generating the disk-locked clock 22 comprises a suitable compensator C 30 and a suitable plant P 32. The compensator C 30 may implement any suitable compensation algorithm, including non-linear algorithms. Similarly any suitable plant P 32 may be employed, wherein in the embodiment of FIG. 2B the plant P 32 comprises a frequency generator 34A for generating the disk-locked clock 22 and counter 34B that counts a number of cycles at a frequency $f_k$ of the disk-locked clock 22 over an interval $t_k$ between data recorded on the disk (e.g., servo data). The number of cycles 35 counted over the interval $t_k$ is subtracted from a target number of cycles 36 of a base frequency $f_0$ counted over a target interval $t_0$ to generate a timing error 38. The timing error 38 is filtered by the timing loop compensator C 30 to generate a timing control signal 40 used to adjust the frequency $f_k$ until the number of cycles at the frequency $f_k$ counted over the interval $t_k$ equals the target number of cycles of the base frequency $f_0$ counted over the target interval $t_0$. In one embodiment, a vibration affecting the disk drive may induce a delta in the rotation velocity of the disk 18 which may induce a timing jitter into the timing loop. Accordingly, in one embodiment feed-forward compensation values 42 are generated at block 44 which adjust the control signal 40 in order to compensate for the vibration.

The disk locked clock 22 may be employed in any suitable manner in the disk drive, such as to open a servo gate relative to servo data written on the disk, timing when to servo write a concentric servo sector, and/or servo write a concentric servo sector at the correct frequency. In another embodiment, the disk-locked clock 22 may be used to write/read data to data sectors in data tracks on the disk 18 during normal access operations, wherein during read operations the disk-locked clock 22 may be synchronized when reading a preamble at the beginning of each data sector as well as synchronized when reading user data from a data sector.

Figure 3:
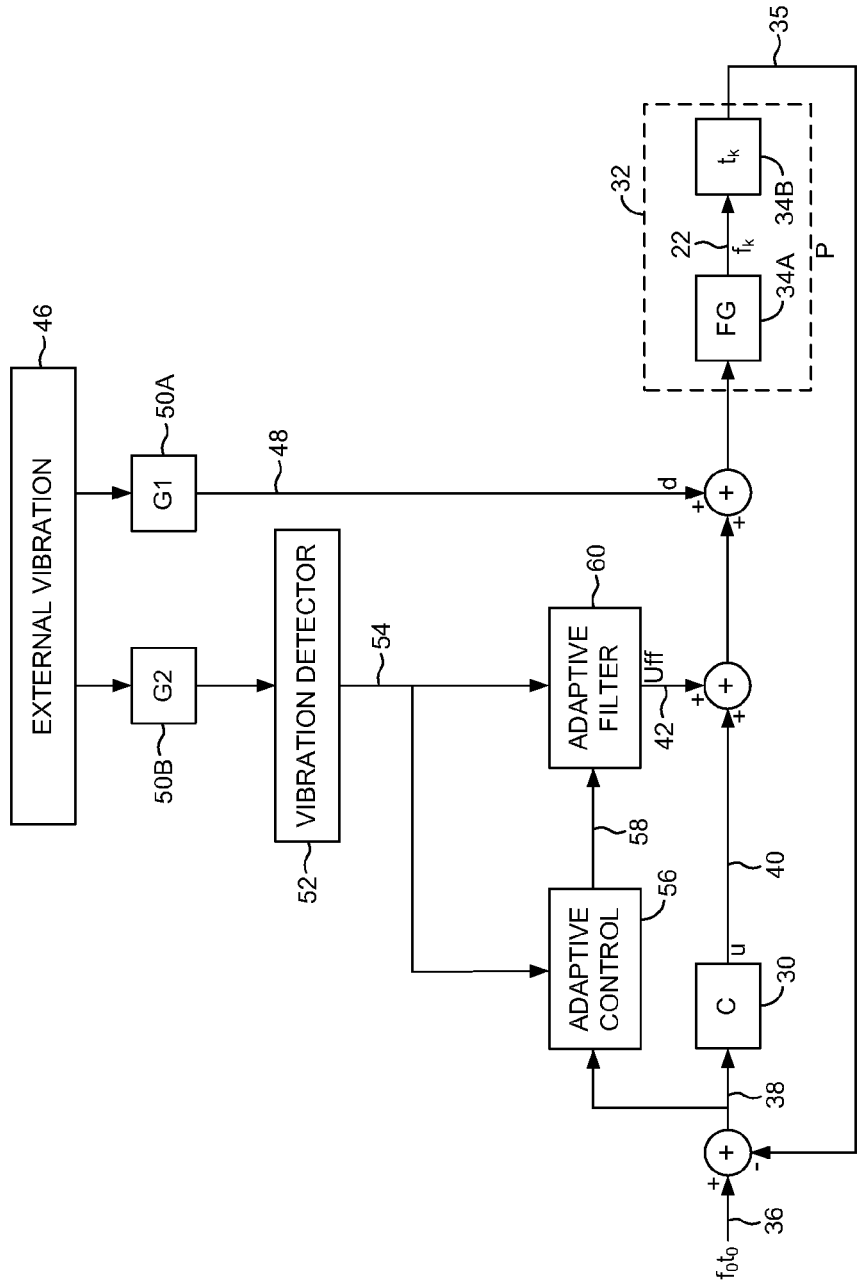
FIG. 3 shows a timing loop according to an embodiment wherein a finite impulse response (FIR) filter is adapted according to a Filtered-X Least Mean Square (LMS) algorithm.

FIG. 3 shows an embodiment wherein a vibration 46 induces a disturbance d 48 into the timing loop, wherein the disturbance d 48 has an unknown transfer function G1 50A relative to the amplitude of the vibration 46. The vibration 46 also affects the vibration detector 52 relative to a transfer function G2 50B. The vibration detector 52 generates a vibration signal 54 in response to the vibration 46. Any suitable vibration detector 52 may be employed, such as a suitable piezoelectric transducer. In another embodiment, the vibration detector 52 may comprise a servo loop that servos the head 16 over the disk 18 based on servo data, wherein the vibration signal 54 may comprise, for example, a position error signal (PES) of the servo loop. Block 56 generates an adaptation control signal 58 based on the vibration signal 54 and the error signal 38 of the timing loop. An adaptive filter 60 is adapted based on the adaptation control signal 58, wherein the adaptive filter 60 filters the vibration signal 54 to generate the feed-forward compensation values 42.

Figure 4:
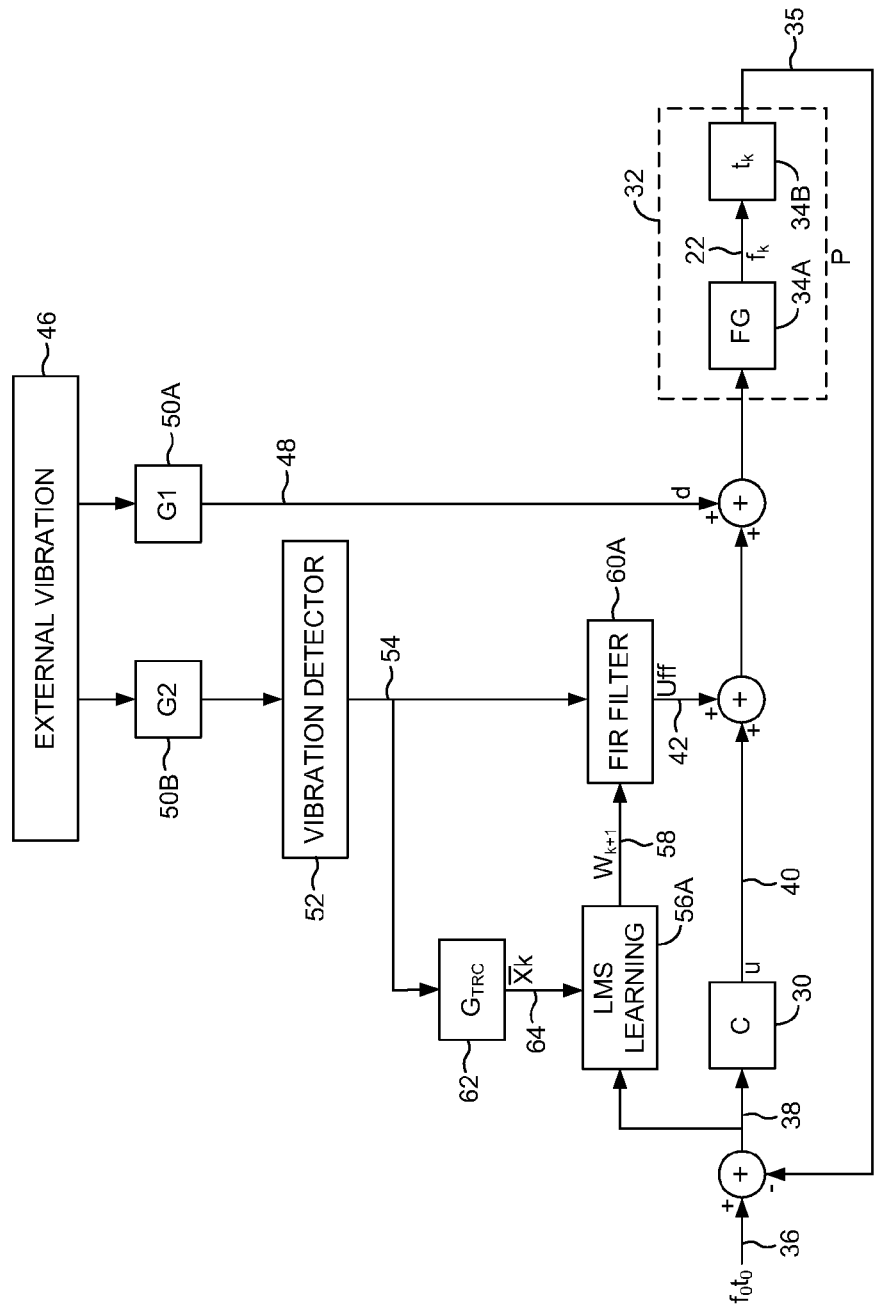
FIG. 4 shows a timing loop according to an embodiment wherein the vibration signal is filtered to generate a compensated vibration signal, and an adaptation control signal is generated based on the compensated vibration signal and the error signal.

FIG. 4 shows an embodiment wherein the vibration signal 54 is processed by a filter 62 representing a torque rejection curve of the timing loop to generate a compensated vibration signal 64. The adaptation control signal 58 is generated based on the compensated vibration signal 64 and the error signal 38. In the embodiment of FIG. 4, the adaptive filter 60A comprises a finite-impulse-response (FIR) filter comprising a plurality of coefficients $W_k$ that are adapted using a Filtered-X Least Mean Square (LMS) algorithm 56A which attempts to minimize $E(e_k^2)$ based on:

$$W_{k+1} = W_k + \mu \overline{X}_k e_k$$

where $\mu$ represents a learning coefficient, $\overline{X}_k$ represents the compensated vibration signal 64 after being filtered by filter $G_{TRC}$ 62 (torque rejection curve of the timing loop), and $e_k$ represents the timing loop error signal 38.

Figure 5:
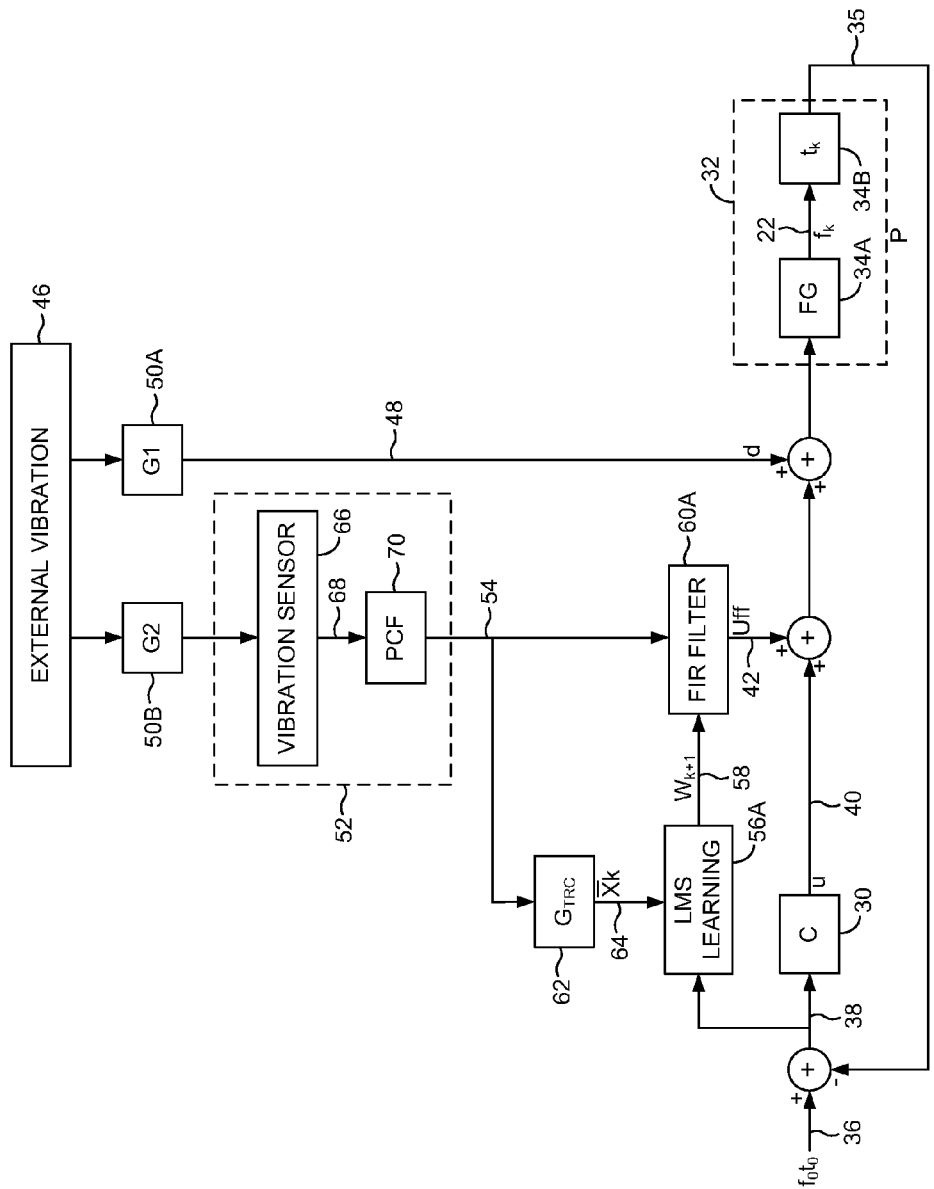
FIG. 5 shows a timing loop according to an embodiment wherein the vibration detector comprises a vibration sensor configured to generate a sensor signal, and a pre-compensation filter (PCF) filters the sensor signal to generate the vibration signal, wherein the PCF compensates for a transfer function of the vibration sensor.

FIG. 5 shows an embodiment wherein the vibration detector 52 comprises a vibration sensor 66 configured to generate a sensor signal 68, and a pre-compensation filter (PCF) 70 configured to filter the sensor signal 68 to generate the vibration signal 54, wherein the PCF 70 compensates for a transfer function of the vibration sensor 66. For example, in one embodiment the PCF 70 may compensate for a phase response of the vibration sensor 66 (e.g., a phase lag or lead) as well as the effect of G1 and G2 so that the vibration signal 54 better represents the actual vibration 46 affecting the disk drive. In one embodiment, the PCF 70 reduces the complexity of the adaptive filter 60A used to generate the feed-forward compensation values 42 in the timing loop. For example, in the embodiment of FIG. 5 the PCF 70 may reduce the number of coefficients $W_k$ of the adaptive FIR filter 60A needed to compensate for the vibrations 46.

FIG. 6A shows a data storage device in the form of a disk drive according to an embodiment comprising a head 72 actuated over a disk 74 comprising a plurality of servo sectors $76_0$-$76_N$ defining servo tracks 78, wherein the head 72 (FIG. 6B) comprises a first read element 80A and a second read element 80B. The disk drive further comprises control circuitry 82 configured to execute the flow diagram of FIG. 6C wherein a first wedge-to-wedge time is measured (block 84) representing a time between consecutive servo sectors passing under the first read element as the disk rotates. A second wedge-to-wedge time is measured (block 86) representing a time between consecutive servo sectors passing under the second read element as the disk rotates. A nominal wedge-to-wedge time is generated (block 88) based on the first wedge-to-wedge time and the second wedge-to-wedge time.

In the embodiment of FIG. 6A, the control circuitry 82 processes a read signal 90 emanating from the head 72 to demodulate the servo sectors $76_0$-$76_N$ and generate a position error signal (PES) representing an error between the actual position of the head and a target position relative to a target track. The control circuitry 82 filters the PES using a suitable compensation filter to generate a control signal 92 applied to a voice coil motor (VCM) 94 which rotates an actuator arm 96 about a pivot in order to actuate the head 72 radially over the disk 74 in a direction that reduces the PES. The servo sectors $76_0$-$76_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the control circuitry 82 comprises a timing loop such as shown in FIG. 2B described above for generating a disk-locked clock 22 substantially synchronized to a rotation frequency of the disk 74. In one embodiment, the counter 34B shown in FIG. 2B counts a number of cycles at a frequency $f_k$ of the disk-locked clock 22 over an interval $t_k$ representing the wedge-to-wedge times. For example, in one embodiment the counter 34B counts the number of cycles at the frequency $f_k$ to measure the first wedge-to-wedge time (WTWT_1) shown in FIG. 6B, as well as counts the number of cycles at the frequency $f_k$ to measure the second wedge-to-wedge time (WTWT_2) shown in FIG. 6B.

Figure 7A:
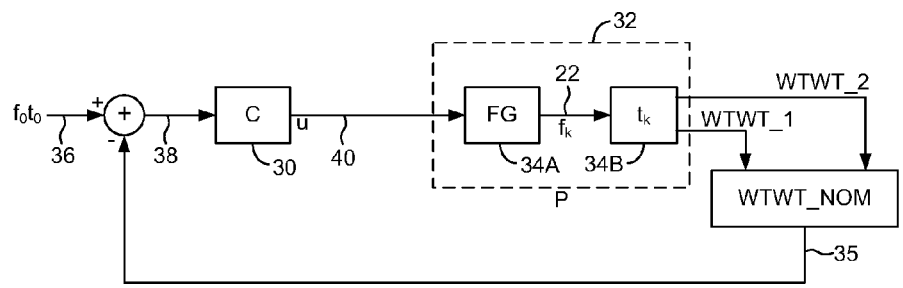
FIG. 7A shows an embodiment wherein a disk-locked clock is substantially synchronized to a rotation frequency of the disk based on the nominal wedge-to-wedge time.
Figure 7B:
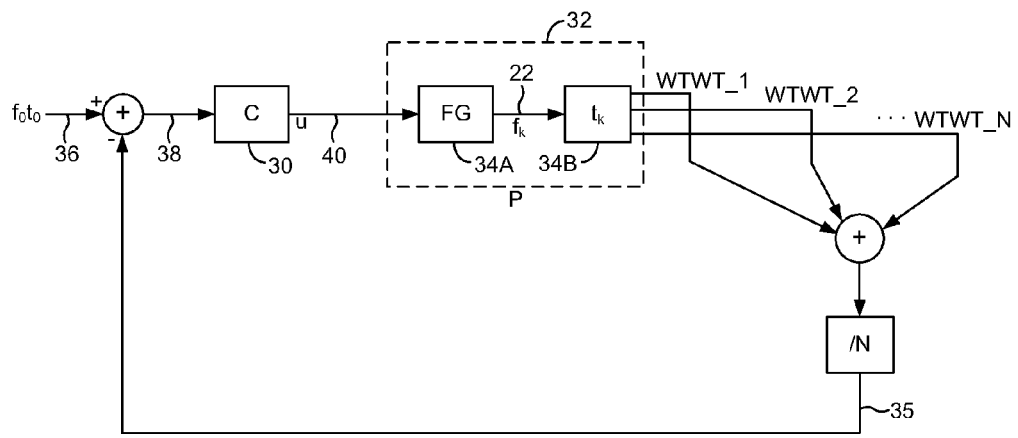
FIG. 7B shows an embodiment wherein the nominal wedge-to-wedge time is generated by averaging the first and second wedge-to-wedge times.

In one embodiment shown in FIG. 7A, the counter 34B counts the number of cycles at the frequency $f_k$ between when a first sync mark is detected in a first servo sector and when a second sync mark is detected in a second, following servo sector. The corresponding wedge-to-wedge time is measured for each of the first and second read elements 80A and 80B, and the resulting wedge-to-wedge times are processed to generate a nominal wedge-to-wedge time 35 used to generate the error signal 38. In one embodiment shown in FIG. 7B, the wedge-to-wedge times measured for each read element are averaged in order to generate the nominal wedge-to-wedge time 35. FIG. 7B also illustrates that the head 72 may comprise any suitable number of read elements for generating a corresponding wedge-to-wedge time that are processed to generate the nominal wedge-to-wedge time. The wedge-to-wedge times may be processed using any suitable statistical analysis, such as by omitting outliers, so that the result of processing multiple wedge-to-wedge times provides a more accurate timing measurement for updating the timing loop.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A data storage device comprising:
a disk;
a head actuated over the disk;
a vibration detector configured to generate a vibration signal in response to a vibration affecting the data storage device; and
control circuitry comprising a timing loop configured to generate a disk-locked clock substantially synchronized to a rotation frequency of the disk, the control circuitry configured to:
  generate an adaptation control signal based on the vibration signal and an error signal of the timing loop;
  adapt an adaptive filter based on the adaptation control signal, wherein the adaptive filter filters the vibration signal to generate feed-forward compensation values; and
  apply the feed-forward compensation values to the timing loop to compensate for the vibration.

2. The data storage device as recited in claim 1, wherein the control circuitry is further configured to:
filter the vibration signal to generate a compensated vibration signal; and
generate the adaptation control signal based on the compensated vibration signal and the error signal.

3. The data storage device as recited in claim 2, wherein filtering the vibration signal to generate the compensated vibration signal comprises filtering the vibration signal with a filter representing a torque rejection curve of the timing loop.

4. The data storage device as recited in claim 2, wherein the control circuitry is operable to adapt the adaptive filter according to:

$$W_{k+1} = W_k + \mu \|\overline{X}_k e_k$$

where:
$W_k$ represents coefficients of the adaptive filter;
$\mu$ represents a learning coefficient;
$\overline{X}_k$ represents the compensated vibration signal; and
$e_k$ represents the error signal.

5. The data storage device as recited in claim 1, wherein the vibration detector comprises:
a vibration sensor configured to generate a sensor signal; and
a pre-compensation filter (PCF) configured to filter the sensor signal to generate the vibration signal, wherein the PCF compensates for a transfer function of the vibration sensor.

6. A data storage device comprising:
a disk comprising a plurality of servo sectors defining servo tracks;
a head actuated over the disk, the head comprising a first read element and a second read element; and
control circuitry configured to:
  measure a first wedge-to-wedge time representing a time between consecutive servo sectors passing under the first read element as the disk rotates;
  measure a second wedge-to-wedge time representing a time between consecutive servo sectors passing under the second read element as the disk rotates; and
  generate a nominal wedge-to-wedge time based on the first wedge-to-wedge time and the second wedge-to-wedge time.

7. The data storage device as recited in claim 6, wherein the control circuitry is further configured to generate the nominal wedge-to-wedge time based on an average of the first wedge-to-wedge time and the second wedge-to-wedge time.

8. The data storage device as recited in claim 6, wherein the control circuitry is further configured to generate a disk-locked clock substantially synchronized to a rotation frequency of the disk based on the nominal wedge-to-wedge time.

9. A method of operating a data storage device, the method comprising:

using a timing loop to generate a disk-locked clock substantially synchronized to a rotation frequency of the disk;

generating an adaptation control signal based on a vibration signal and an error signal of the timing loop;

adapting an adaptive filter based on the adaptation control signal, wherein the adaptive filter filters the vibration signal to generate feed-forward compensation values; and applying the feed-forward compensation values to the timing loop to compensate for the vibration.

10. The method as recited in claim 9, further comprising:
filtering the vibration signal to generate a compensated vibration signal; and
generating the adaptation control signal based on the compensated vibration signal and the error signal.

11. The method as recited in claim 10, wherein filtering the vibration signal to generate the compensated vibration signal comprises filtering the vibration signal with a filter representing a torque rejection curve of the timing loop.

12. The method as recited in claim 10, further comprising adapting the adaptive filter according to:

$$W_{k+1} = W_k + \mu \bar{X}_k e_k$$

where:
$W_k$ represents coefficients of the adaptive filter;
$\mu$ represents a learning coefficient;
$\bar{X}_k$ represents the compensated vibration signal; and
$e_k$ represents the error signal.

13. The method as recited in claim 9, further comprising filtering a sensor signal generated by a vibration sensor to generate the vibration signal, wherein the filtering compensates for a transfer function of the vibration sensor.

14. A method of operating a data storage device, the method comprising:
measuring a first wedge-to-wedge time representing a time between consecutive servo sectors passing under a first read element as a disk rotates;
measuring a second wedge-to-wedge time representing a time between consecutive servo sectors passing under a second read element as the disk rotates; and
generating a nominal wedge-to-wedge time based on the first wedge-to-wedge time and the second wedge-to-wedge time.

15. The method as recited in claim 14, further comprising generating the nominal wedge-to-wedge time based on an average of the first wedge-to-wedge time and the second wedge-to-wedge time.

16. The method as recited in claim 14, further comprising generating a disk-locked clock substantially synchronized to a rotation frequency of the disk based on the nominal wedge-to-wedge time.

* * * * *